(12) United States Patent
Bugaris et al.

(10) Patent No.: US 8,952,252 B2
(45) Date of Patent: Feb. 10, 2015

(54) ARC RESISTANT ELECTRICAL ENCLOSURE

(75) Inventors: Rachel M. Bugaris, West Columbia, SC (US); David T. Rollay, Franklin, WI (US); Chester Malkowski, Franklin, WI (US); Jerome Charles Lange, Jr., New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 440 days.

(21) Appl. No.: 13/075,698

(22) Filed: Mar. 30, 2011

(65) Prior Publication Data
US 2012/0097413 A1  Apr. 26, 2012

Related U.S. Application Data

(60) Provisional application No. 61/405,907, filed on Oct. 22, 2010.

(51) Int. Cl.
| | |
|---|---|
| *H01J 5/00* | (2006.01) |
| *H01J 15/00* | (2006.01) |
| *H02G 3/08* | (2006.01) |
| *H05K 5/00* | (2006.01) |
| *H01H 33/08* | (2006.01) |
| *H02B 13/025* | (2006.01) |

(52) U.S. Cl.
CPC .................................. *H02B 13/025* (2013.01)
USPC ............. 174/50; 361/724; 218/156; 218/157; 454/184

(58) Field of Classification Search
CPC ........ H01R 13/743; H01R 25/16; H02B 1/20; H02B 1/21; H02B 1/32; H02B 1/34; H02B 1/36; H02B 13/025; H05K 7/20145; H05K 7/20754
USPC ................... 174/50; 361/608, 724, 605, 828; 312/216, 217, 219; 218/156, 157; 454/184
See application file for complete search history.

(56) References Cited

U.S. PATENT DOCUMENTS

| | | | | | |
|---|---|---|---|---|---|
| 2,042,848 | A | * | 6/1936 | Horn | 361/724 |
| 2,091,549 | A | * | 8/1937 | Kelso | 361/724 |
| 2,345,792 | A | * | 4/1944 | Cann | 174/153 R |
| 2,730,420 | A | * | 1/1956 | Bruck | 220/661 |
| 3,066,244 | A | * | 11/1962 | Defandorf et al. | 174/560 |
| 3,482,143 | A | * | 12/1969 | Bugni et al. | 361/608 |
| 3,495,135 | A | * | 2/1970 | Paape | 361/608 |

(Continued)

OTHER PUBLICATIONS

U.S. Appl. No. 12/846,511, filed Jul. 29, 2010, (Kingston, applicant).

*Primary Examiner* — Chau N Nguyen
*Assistant Examiner* — Roshn Varghese
(74) *Attorney, Agent, or Firm* — Fletcher Yoder, P.C.

(57) ABSTRACT

Electrical enclosures are provided that include arc resistant features designed to add structural strength for arc containment, to inhibit arc propagation, and/or to direct the release of pressure within and/or from the enclosure in order to provide arc resistant electrical enclosures. In general, the arc resistant features may be designed to provide enclosures where in the event of an arc fault, the doors and covers remain closed, parts are not ejected from the enclosure, holes are not produced in the enclosure, indicators located in close proximity to the enclosure do not ignite, and/or grounding connections remain effective. Further, the foregoing features may be designed to provide electrical enclosures that comply with industry guides and standards for arc resistant ratings.

17 Claims, 14 Drawing Sheets

(56) References Cited

U.S. PATENT DOCUMENTS

| | | | | |
|---|---|---|---|---|
| 3,626,253 A | * | 12/1971 | Sturdivan | 361/608 |
| 4,528,614 A | * | 7/1985 | Shariff et al. | 361/678 |
| 5,457,296 A | * | 10/1995 | Neill et al. | 200/306 |
| 5,865,478 A | * | 2/1999 | Lin | 285/405 |
| 5,905,244 A | * | 5/1999 | Smith et al. | 218/155 |
| 6,007,421 A | * | 12/1999 | Schwarz | 454/160 |
| 6,215,654 B1 | * | 4/2001 | Wilkie et al. | 361/605 |
| 6,301,108 B1 | * | 10/2001 | Stockbridge | 361/688 |
| 6,333,851 B1 | * | 12/2001 | Shih | 361/695 |
| 6,392,141 B1 | * | 5/2002 | Smith et al. | 174/50 |
| 6,407,331 B1 | * | 6/2002 | Smith et al. | 174/50 |
| 6,512,669 B1 | * | 1/2003 | Goodwin et al. | 361/601 |
| 6,842,349 B2 | * | 1/2005 | Wrycraft et al. | 361/796 |
| 6,957,670 B1 | * | 10/2005 | Kajino | 138/157 |
| 7,264,321 B1 | * | 9/2007 | Bueley et al. | 312/265.5 |
| 7,417,848 B2 | | 8/2008 | Bergmann et al. | |
| 7,510,223 B2 | | 3/2009 | Malkowski, Jr. et al. | |
| 7,525,809 B2 | | 4/2009 | Bergmann et al. | |
| 7,561,412 B2 | | 7/2009 | Brandt et al. | |
| 7,726,751 B2 | | 6/2010 | Bergmann et al. | |
| 7,778,013 B2 | | 8/2010 | Bruski et al. | |
| 7,952,869 B2 | * | 5/2011 | Lewis et al. | 361/695 |
| 2004/0182799 A1 | * | 9/2004 | Tachibana | 211/26 |
| 2006/0067018 A1 | | 3/2006 | Malkowski et al. | |
| 2007/0097604 A1 | | 5/2007 | Bruski et al. | |
| 2007/0108877 A1 | * | 5/2007 | Bergmann et al. | 312/219 |
| 2008/0068791 A1 | * | 3/2008 | Ebermann | 361/687 |
| 2009/0021925 A1 | * | 1/2009 | Heimann et al. | 361/818 |
| 2009/0200273 A1 | * | 8/2009 | Josten et al. | 218/157 |
| 2010/0314166 A1 | | 12/2010 | Malkowski, Jr. et al. | |

\* cited by examiner

ARC RESISTANT ELECTRICAL ENCLOSURE

CROSS REFERENCE TO RELATED APPLICATIONS

This application is a Non-Provisional of U.S. Patent Application No. 61/405,907, entitled "Motor Control Center", filed Oct. 22, 2010, which is herein incorporated by reference.

BACKGROUND

The invention relates generally to the field of electrical enclosures, such as enclosures for motor control centers used in industrial and commercial settings. More particularly, embodiments of the present invention relate to electrical enclosures designed with arc resistant features.

Electrical enclosures and cabinets can be used in a wide range of industrial and automation applications. In general, electrical enclosures typically include a shell or box made of a heavy gauge sheet metal. The enclosures are configured to support electrical circuitry and electrical components therein, and to receive and send electrical power and data signals. The enclosures may include both small and large individual units, such as for housing components, such as contactors and other switches. Further, larger enclosures can be employed to house various power electronics equipment, control circuits, motor drives, and so forth. For example, in industry it is common to find large enclosures divided into bays or segments for single and three-phase switches, motor controllers, programmable logic controllers, data and power network interfaces, and so forth.

A particular challenge in the design and operation of electrical components in enclosures relates to designing the enclosures to withstand the mechanical and thermal effects of an internal arcing fault (also called an arc, arc fault, arc flash, arcing flash, etc.). For example, certain types of electrical faults can produce arcs that can heat and even vaporize neighboring components and cause sudden pressure increases and localized overheating. While development of protective circuitry has focused on interrupting such faults extremely quickly, even a few cycles of alternating current can suffice to vaporize wires, insulation, and even component housings. Such faults can result in volumes of hot gas that expand and must be channeled and/or vented within or from the enclosure. Further, the faults can produce high temperatures and pressure increases that cause mechanical and thermal stresses on the electrical enclosures. Arcing faults can cause damage to equipment and facilities and increase costs due to lost production. Accordingly, industrial standards and guides have been developed as a way for manufacturers to demonstrate that the electrical enclosures can withstand the mechanical and thermal effects of an internal arcing fault.

BRIEF DESCRIPTION

The arc resistant enclosures described herein include arc resistant features. In general, the arc resistant features include features designed to add structural strength for arc containment, to inhibit arc propagation, and/or to direct the release of pressure within and/or from the enclosure in order to provide arc resistant electrical enclosures that can withstand an internal arcing fault. For example, the enclosures may include a pressure relief device that allows gases to escape from a certain area of the enclosure. Further, the enclosures may include interior baffles designed to direct the gases away from certain areas of the enclosure and/or to direct the gases towards the pressure relief device. In another example, the enclosures may include structural features, such as external angles, stiffener brackets, fasteners, and latches designed to provide structural support for the enclosure. Moreover, certain components of the enclosures may be connected together to enhance the structural support of the enclosure. The enclosures also may include interphase barriers and insulation designed to inhibit arc propagation.

In general, the arc resistant features may be designed to provide enclosures that comply with certain criteria in the event of an arc fault. For example, the arc resistant features may be designed to provide enclosures where, in the event of an arc fault, the doors and covers remain closed, parts are not ejected from the enclosure, holes are not produced in the enclosure, indicators located in close proximity to the enclosure do not ignite, and/or grounding connections remain effective. Further, the foregoing features may be designed to provide electrical enclosures that comply with industry guides, standards, and/or criteria for arc resistant ratings. According to certain embodiments, the electrical enclosures may be particularly well suited for holding low voltage components, such as motor control components and protection devices, among others.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
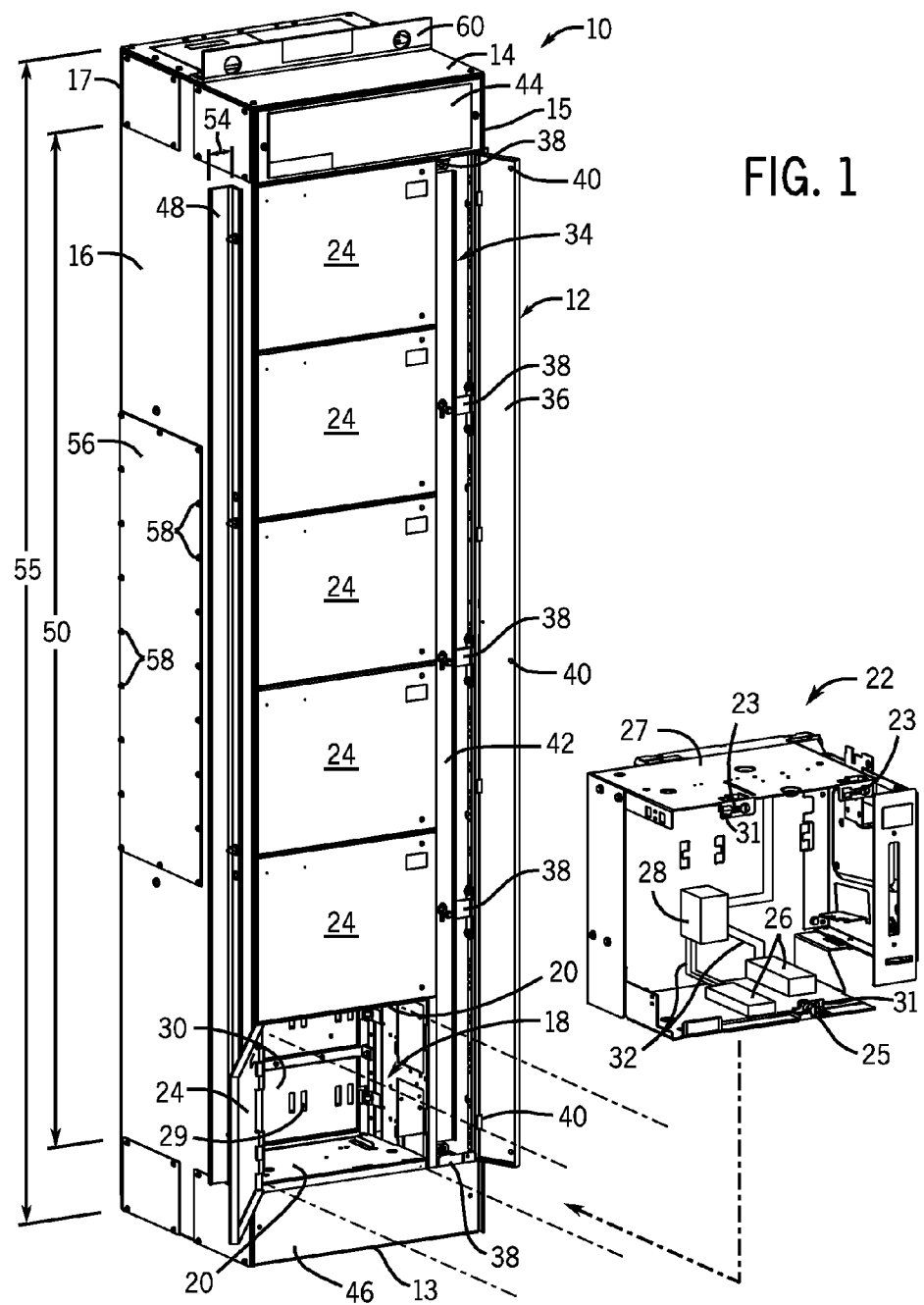
FIG. 1 is a perspective view of an embodiment of an arc resistant electrical enclosure in accordance with the present techniques.

FIG. 1 depicts an embodiment of an arc resistant electrical enclosure 10. In general, the arc resistant electrical enclosures 10 are enclosures designed to withstand the mechanical and thermal effects of an internal arcing fault. The enclosures 10 include arc resistant features designed to add structural strength for arc containment, to inhibit arc propagation, and/or to direct the release of pressure within and/or from the enclosure. The arc resistant features may be designed to provide enclosures where in the event of an arc fault, the doors and covers remain closed, parts are not ejected from the enclosure, holes are not produced in the enclosure, indicators located in close proximity to the enclosure do not ignite, and/or grounding connections remain effective. Further, the arc resistant features may be designed to provide electrical enclosures that comply with industry guides, criteria, and/or standards for arc resistant ratings.

The enclosure 10 may be any suitable type and size. In the illustrated embodiment, for example, the enclosure 10 may house an industrial motor control center (MCC). The enclosure generally includes a shell 12 formed of panels 13, 14, 15, 16, and 17, which in certain embodiments, may be heavy gauge sheet metal panels. The shell 12 includes a bottom panel 13, a top panel 14 disposed opposite to the bottom panel 13, a pair of side panels 15 and 16 extending between the bottom and top panels 13 and 14, and a rear panel 17 that extends between the bottom and top panels 13 and 14 and the side panels 15 and 16. According to certain embodiments, the panels 13, 14, 15, 16, and 17 may be sheet metal panels connected together, for example, via flanges and fasteners.

The shell 12 is divided into compartments 18 by unit support pans 20 designed to support component units 22. The relative shapes, sizes, and numbers of compartments 18 within a shell 12 may vary. The unit support pans 20 extend orthogonally between the side panels 15 and 16. According to certain embodiments, the unit support pans 20 may be coupled to the side panel 16 and an intermediate support that extends generally parallel to side panel 15. Each compartment 18 may have a corresponding door 24, which when closed restricts access to the compartments 18. According to certain embodiments, the doors 24 may be secured in the closed position using arc resistant latches, such as those described in U.S. Pat. No. 7,510,220, entitled "Arc Resistant Electrical Enclosure System and Method," which is herein incorporated by reference.

The component units 22 may be plug-in units that can be inserted into the compartments 18. Latches 23 and 25 may be disposed on a housing 27 of the component units 22 and may be used to secure the component unit 22 within a compartment 18. For example, according to certain embodiments, the latches 23 may each include a rotatable projection 31 that fits within a corresponding slot in the support unit 20 disposed above the component unit 22. The latch 25 also may include a rotatable projection 31 that fits within a corresponding slot in the support unit 20 disposed below the compartment unit 22. According to certain embodiments, each component unit 22 may have at least two latches 23 and 25 for securing the component unit 22 within the compartment 18. Further, the latches 23 and 25 may be designed to retain the component unit 22 within the compartment 18 in the event of an arc fault.

Each component unit 22 may include one or more components 26, such as relays, motor starters, circuit breakers, variable frequency drives, programmable logic controllers (PLCs), or the like, that provide functionality for controlling a system or process. Each component unit 22 also may include one or more stabs housings 28 that isolate electrical connectors, such as metal power stabs that engage vertical bus bars (not shown) disposed within the rear of the enclosure 10. For example, the stab housings 28 may isolate power stabs that extend through openings 29 in a bus cover 30 to engage the vertical bus bars located in the rear of the enclosure 10. The bus cover 30 may longitudinally divide the interior of the electrical enclosure 10 into a front portion that houses the compartments 18 and a rear portion that extends between the bus cover 30 and the rear panel 17 to house power bus bars and related components. Wires 32 within the component units 22 may tie into the stab housings 28 to access the power stabs and provide power from the power stabs to the components 26. Moreover, in certain embodiments, each power stab may be directly crimped to the wires 32 without employing separate screws or connectors. According to certain embodiments, each component unit 22 included within the enclosure 10 also may include a heavy-duty ground stab that engages the vertical plug-in ground bus (not shown). Further, in certain embodiments, each component unit 22 may include a dedicated ground stab that uses a high-pressure, four-point contact construction.

The enclosure 10 also includes a vertical wireway 34 over which a door 36 may be closed. As may be appreciated, electrical system components are typically disposed within the interior volume of the compartments 18, while control and communication wiring may be routed through the wireway 34. As discussed further below with respect to FIGS. 8 and 9, the enclosure 10 includes several arc latch brackets 38 that can be employed to secure the door 36 in the closed position. For example, latch pins 40 can be inserted through the door 36 and can interface with the arc latch brackets 38 to secure the door 36 in the closed position. According to certain embodiments, the enclosure 10 may include at least five arc latch brackets 38 for securing the wireway door 36. The arc latch brackets 38 also can be used to secure a wireway baffle 42 within the enclosure 10. The wireway baffle 42 may be designed to inhibit the flow of gases through the seam where the wireway door 36 seals against the enclosure 10. The enclosure 10 also includes an upper horizontal wireway and a lower horizontal wireway, which are enclosed by horizontal wireway covers 44 and 46.

The enclosure 10 further includes one or more external angles 48 that are coupled to the side panels 15 and 16 that are disposed on the end of an enclosure lineup. For example, as shown in FIG. 1, the enclosure 10 may be a standalone unit that consists of a single shell 12. In these embodiments, an external angle 48 may extend along a length 50 of each side panel 15 and 16. However, in other embodiments, as discussed further below with respect to FIG. 14, two or more shells may be connected together to form a larger enclosure. In these embodiments, external angles 48 may be disposed only on the outermost side panels.

According to certain embodiments, the external angles 48 may include formed heavy gauge sheet metal or extruded metal angles. Further, the external angles 48 may extend a distance 54 outward from the side panels 15 and 16. According to certain embodiments, the external angles 48 may extend perpendicularly outwards from the side panels 15 and 16. In certain embodiments, the external angles 48 may extend along the side panels 15 and 16 for a length 50 that is at least approximately 80 to 95 percent of the total length 55 of the side panels 16. Further, in certain embodiments, the length 50 may be at least approximately 70 inches, or more specifically, at least 75 inches, and the distance 54 may be at least approximately 2 inches. The external angles 48 may be fastened to the side panels 15 and 16, for example, by bolts or other suitable fasteners, and may be designed to inhibit bowing of the side panels 15 and 16 in the event of an arc fault. One or more side closing plates 56 also may be coupled to the outer side panels 15 and 16 by fasteners 58. The side closing plates 56 may enclose openings for accessing the interior of the electrical enclosure 10 through the side panels 15 and 16. Further, a lifting angle 60 may be coupled to the top panel 14 to facilitate positioning of the enclosure 10.

Figure 2:
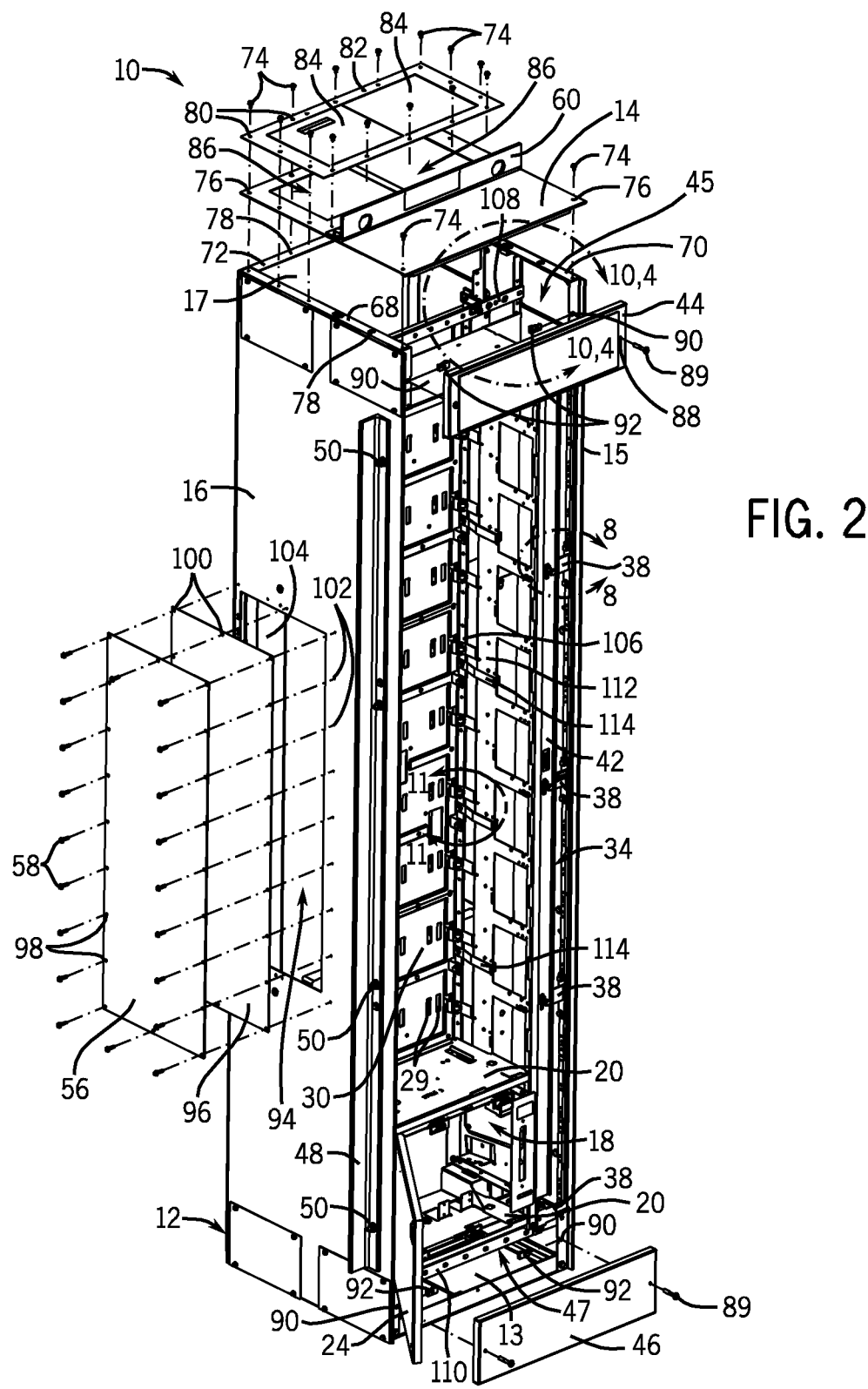
FIG. 2 is a partially exploded view of the electrical enclosure of FIG. 1 in accordance with the present techniques.

FIG. 2 is a partially exploded view of the enclosure 10, with certain components omitted to reveal the interior of the enclosure 10. The enclosure 10 includes the shell 12 that is formed from the bottom panel 13, the top panel 14, the side panels 15 and 16, and the rear panel 17. The side panels 16 and 15 and the rear panel 17 each include a flange 68, 70, and 72, respectively, that extends around the perimeter of the panels 16, 15, and 17. The flanges 68, 70, and 72 may facilitate attachment of the top panel 14 to the electrical enclosure 10. In particular, fasteners 74 can be inserted through apertures 76 in the top panel 14 and apertures 78 in the flanges 68, 70, and 72 to couple the top panel 14 to the flanges 68, 70, and 72.

The fasteners 74 also may be inserted through apertures 80 in a pressure relief plate 82 to couple the pressure relief plate 82 to the top panel 14. The pressure relief plate 82 includes flaps 84 that generally align with openings 86 in the top panel 14. As discussed further below with respect to FIGS. 6 and 7, the pressure relief plate 82 includes flaps 84 that can be opened in the event of an arc fault to vent gases through the top of the enclosure 10. In other embodiments, the top panel 14 may include the pressure relief flaps, and, in these embodiments, the pressure relief plate 82 may be omitted.

The flanges 68 and 70 on the side panels 16 and 15 also can facilitate attachment of the wireway covers 44 and 46 that enclose horizontal wireways 45 and 47. Horizontal wireway 45 may be located in the upper potion of the enclosure 10 adjacent to top panel 14, and horizontal wireway 47 may be located in the lower portion of the enclosure 10 adjacent to the bottom panel 13. The wireway covers 44 and 46 include apertures 88 designed to align with corresponding apertures 90 in the flanges 68 and 70. As discussed further below with respect to FIG. 4, fasteners such as u-nuts 92 can be affixed to the flanges 68 and 70 and used to secure the flanges 68 and 70 to the wireway covers 44 and 46. Further, a fastener 89, such as a screw can be inserted through apertures 88 and 90 and secured to the u-nut 92.

Figure 14:
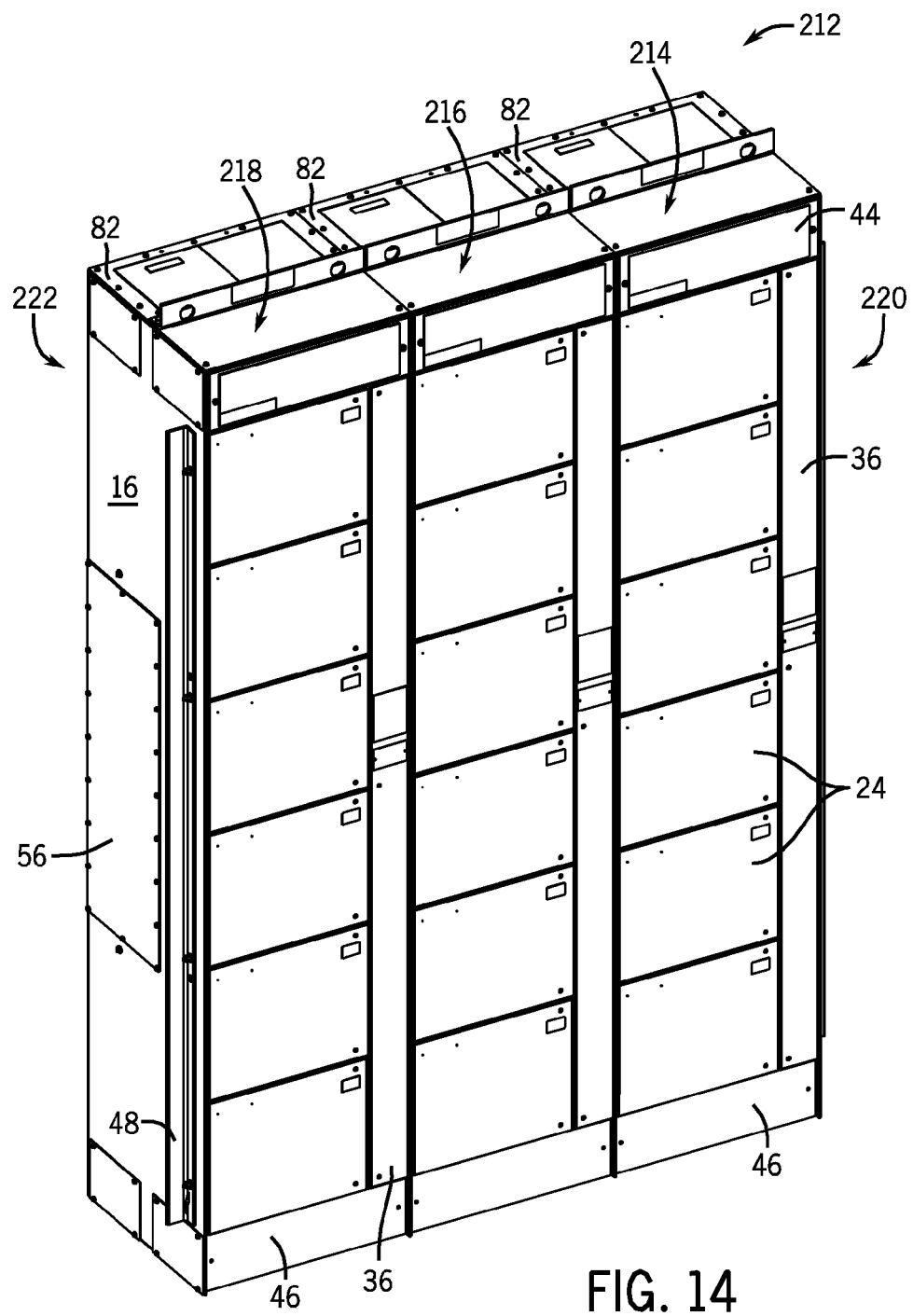
FIG. 14 is a perspective view of another embodiment of an electrical enclosure in accordance with the present techniques.

The side panel 16 also includes an opening 94 that can be used to access components and power bus bars within the enclosure 10. The side closing plate 56 and an insulated plate 96 can be disposed over the opening 94 to seal the opening 94. The insulated plate 96 may be disposed between the side closing plate 56 and the opening 94. According to certain embodiments, the insulated plate 96 may include glass polyester insulation, or other type of insulation. The insulated plate 96 may be designed to inhibit arcing, for example, phase-to-phase arcing, or phase-to-ground arcing, which, in turn can result in a pressure reduction in the enclosure 10. Although not shown in FIG. 2, the other side panel 15 also may include a similar access opening covered by a side closing plate and an insulated plate. When the enclosure 10, as shown in FIG. 2, includes a standalone shell 12, each side panel 15 and 16 may include an insulated plate 96 disposed between the side closing plate 56 and the respective side panel 15 and 16. In other embodiments, for example, as shown in FIG. 14, an enclosure may include multiple shells disposed in a side-by-side arrangement. In these embodiments, the side panels that are located on the outermost sides of the enclosure 12 (i.e., the ends of the lineup) may include insulated plates 96 and side closing plates 56.

As discussed further below with respect to FIG. 2, a corner baffle 104 also may be coupled to the side panel 16 to inhibit the flow of gases through the seam between the side panel 16 and the insulated plate 96, as well as through the seam between the side panel 16 and the rear panel 17. According to certain embodiments, a corner baffle may be coupled to each side panel 15 and 16 that is located at the end of an enclosure lineup. For example, in the embodiment shown in FIG. 2, a corner baffle also may be coupled to the side panel 15. Further, in other embodiments, the corner baffles may be coupled to the rear panel 17.

The enclosure 10 also includes ground buses 106, 108, and 110. In particular, a vertical equipment load ground bus 106 extends at least partially along the length 55 (FIG. 1) of the enclosure 10 adjacent to each of the compartments 18. According to certain embodiments, the vertical ground bus 106 may be constructed of copper and may be affixed to a side support 112 using brackets 114, as discussed further below with respect to FIG. 11. The side support 112 may extend generally parallel to the side panel 15 to separate the vertical wireway 34 from the compartments 18. The ground buses 108 and 110 may be horizontal ground buses that extend generally between side panels 15 and 16 within horizontal wireways 45 and 47. According to certain embodiments, paint may be removed from the sections of the side panels 15 and 16 that are coupled to the horizontal ground buses 108 and 110 to promote a good connection between the ground buses and the side panels. The ground bus 108 may extend horizontally along a top section of the enclosure 10, generally behind upper wireway cover 44, and ground bus 110 may extend horizontally along a bottom section of the enclosure 10, generally behind lower wireway cover 46. The horizontal ground buses 108 and 110 are each connected to the vertical ground bus 106, which may provide additional strength and support for the enclosure 10.

Figure 3:
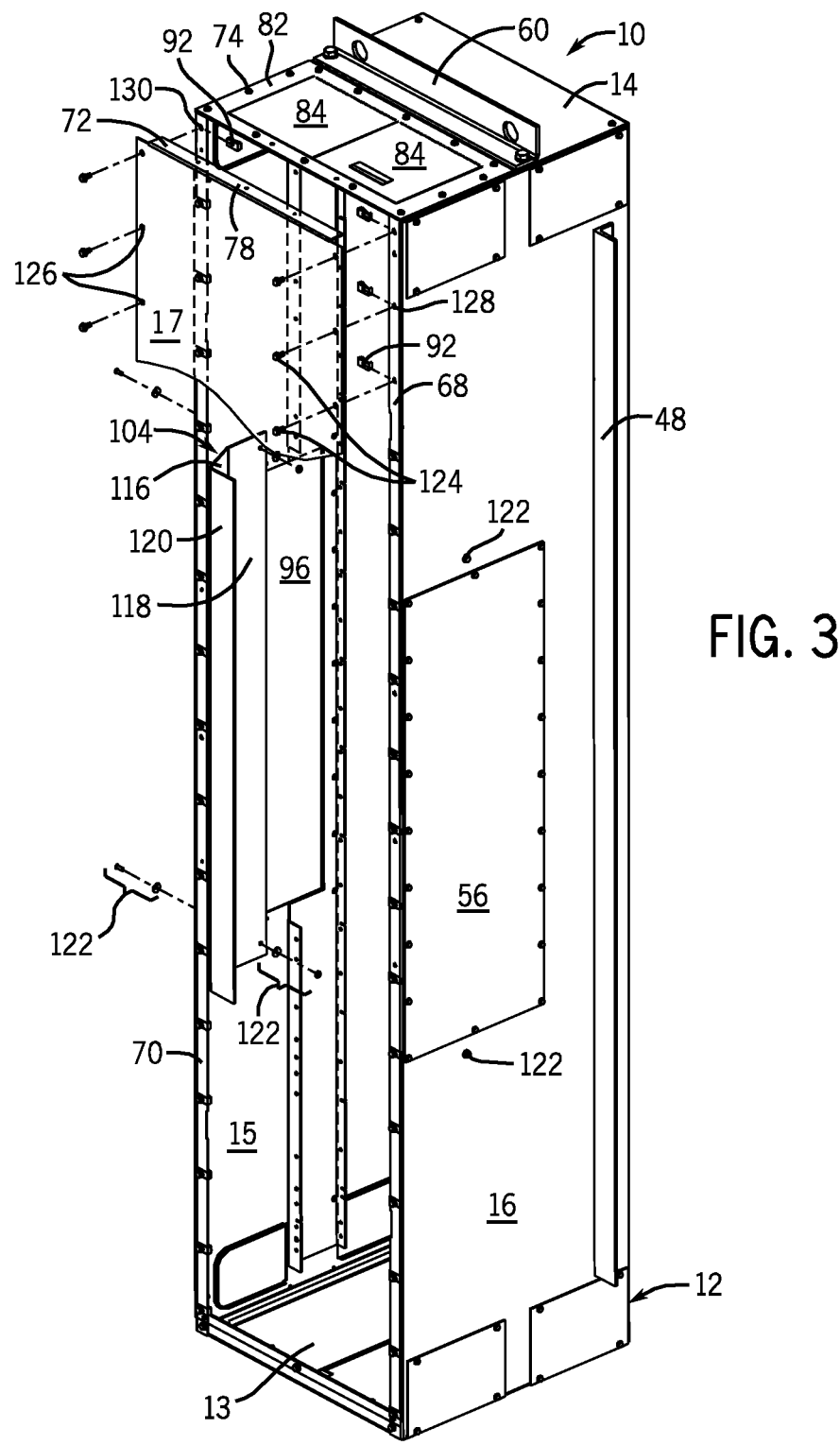
FIG. 3 is a perspective view of the rear of the electrical enclosure of FIG. 1 in accordance with the present techniques.

FIG. 3 is a partially exploded view of the rear of the enclosure 10 with a portion of the rear panel 17 cut away to show the corner baffle 104 affixed to the side panel 15. The corner baffle 104 includes a center section 116 that is disposed between outer sections 118 and 120 that extend from center section 116 at angles. The outer section 118 is affixed to side panel 15. For example, fasteners 122 may be employed to secure the outer section 118 of the corner baffle 104 to the side panel 15. The outer section 118 abuts the side panel 15 and insulated plate 96, while the other outer section 120 abuts the rear panel 17. As noted above with respect to FIG. 2, the other side panel 16 also may include a corner baffle 104 that is affixed to the side panel 16 via fasteners 122. According to certain embodiments, the corner baffles 104 also may be affixed to the rear panel 17.

The rear panel 17 may be affixed to flanges 68 and 70 of the side panels 16 and 15 using fasteners 124 inserted through apertures 126 in the rear panel 17 and through apertures 128 and 130 in the flanges 68 and 70. According to certain embodiments, the fasteners 124 may be thread rolling fasteners, such as Taptite thread rolling fasteners, commercially available from Research Engineering and Manufacturing Inc.

of Middleton, R.I. The fasteners 124 also may be inserted through u-nuts 92 to secure the rear panel 17 to the side panels 16 and 15 and to the top panel 14, as described further below with respect to FIGS. 4 and 5. As noted above, fasteners 74 also may be inserted through apertures 72 in the flange 78 of the rear panel 17 to secure the rear panel 17 to the top panel 14.

Figure 4:
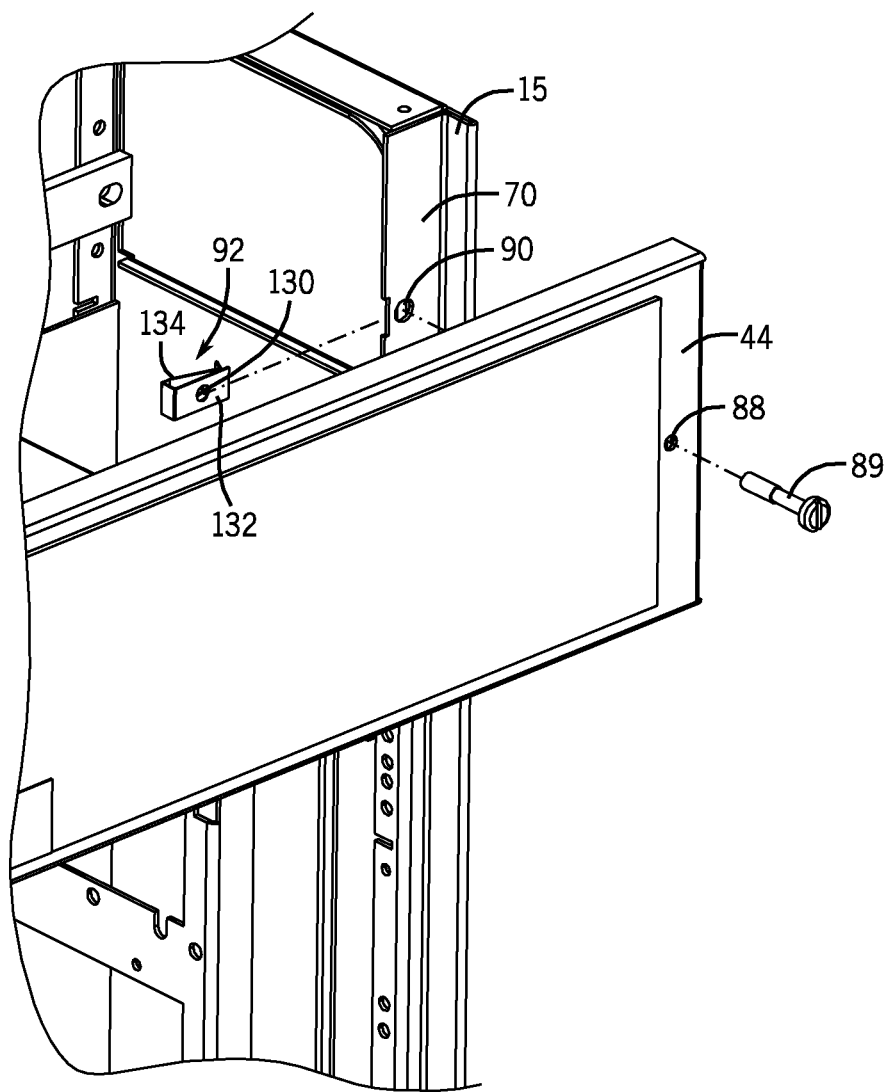
FIG. 4 is a detailed perspective view of a portion of the electrical enclosure of FIG. 1 depicting a wireway cover in accordance with the present techniques.
Figure 5:
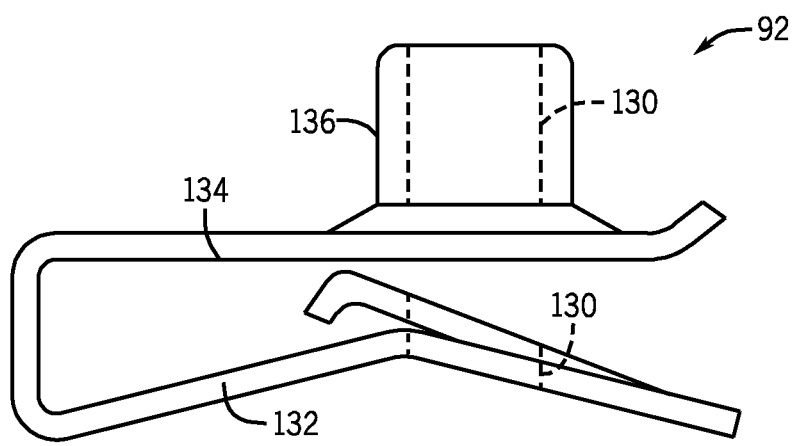
FIG. 5 is a side view of an embodiment of a u-nut that may be employed to secure the wireway cover of FIG. 4 in accordance with the present techniques.

FIGS. 4 and 5 are detailed views of an embodiment of the u-nut 92 that can be employed to attach the wireway covers 44 and 46 to the enclosure 10 and/or to attach the back panel 17 to the enclosure 10. Although FIG. 4 depicts the u-nut 92 in the context of attaching the upper wireway cover 44 to the enclosure 10, a similar attachment method can be employed to attach the lower wireway cover 46 to the enclosure 10 and to attach the rear panel 17 to the enclosure 10. Further, in certain embodiments, the u-nuts 92 may be employed to attach the side closing plate 56 and the insulated plate 96 to a side panel 15 or 16, as shown in FIG. 2. As shown in FIG. 4, the u-nut 92 may be inserted over the flange 70 of the side panel 15 so that apertures 130 in the u-nut 92 align with the aperture 90 in the flange 70. The u-nut 92 includes opposing surfaces 132 and 134 that may be disposed on opposite sides of the flange 70. The fastener 89 can then be inserted through the apertures 88, 90, and 130. Threads on the fastener 89 may mate with a threaded portion 136 of the u-nut 92 to secure the fastener 89 to the u-nut 92. According to certain embodiments, the u-nuts 92 may provide an increased surface area for thread engagement, thereby, providing additional strength in the attachment of the wireway covers 44 and 46 and the rear panel 17 to the enclosure 10, when compared to traditional fasteners. The strength of attachment provided by the u-nuts 92 may help contain the thermal and pressure effects of an arc fault. Further, in other embodiments, the wireway covers 44 and 46 and/or the rear panel 17 may be secured to the enclosure 10 using nut and bolt type connections rather than u-nuts.

Figure 6:
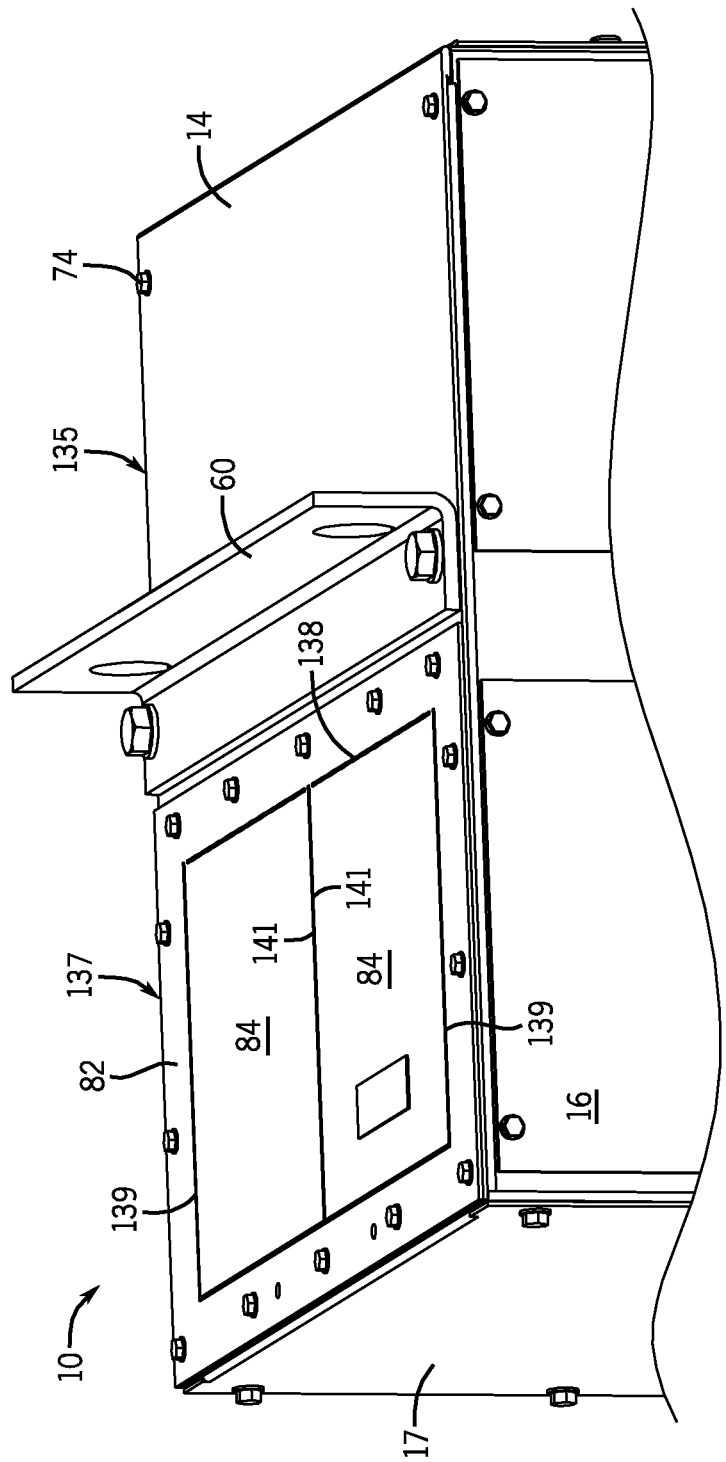
FIG. 6 is a perspective view of a pressure relief plate that may be employed in the electrical enclosure of FIG. 1 in accordance with the present techniques.
Figure 7:
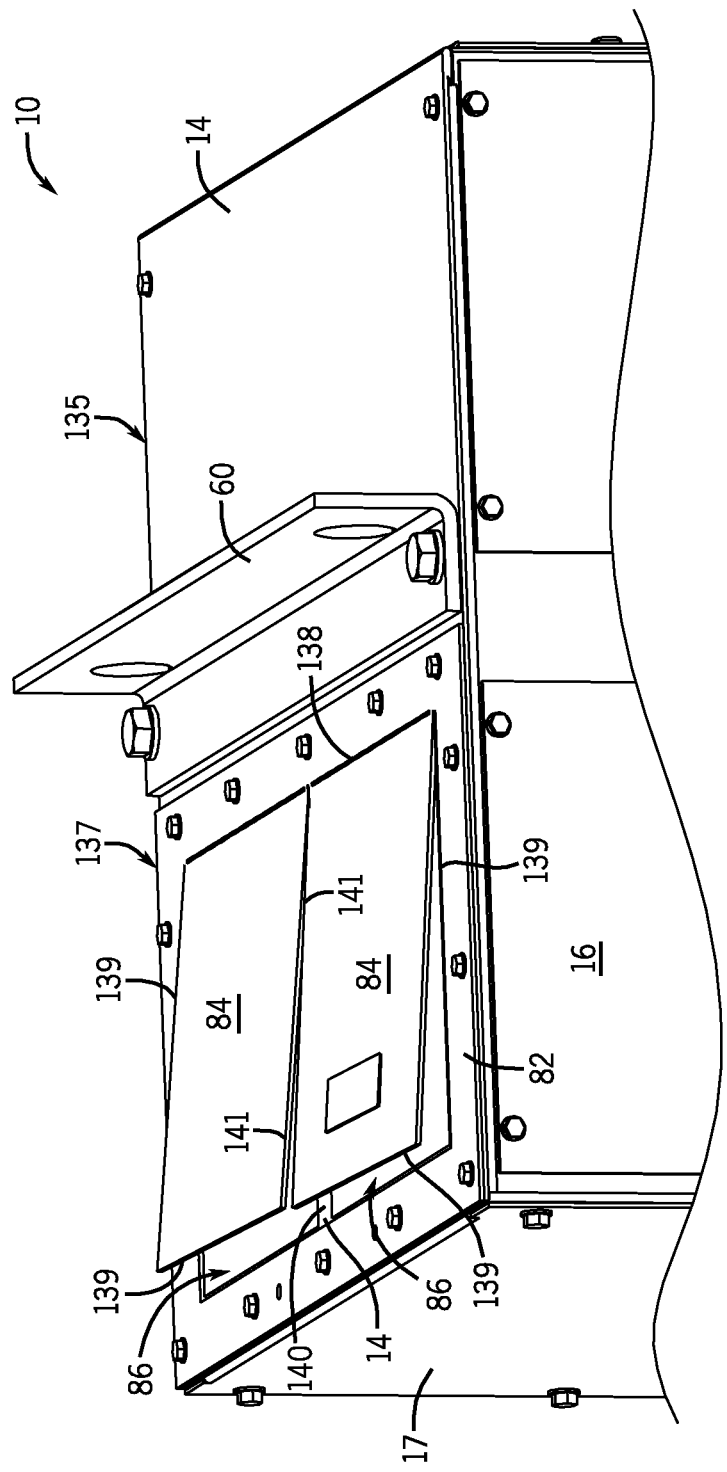
FIG. 7 is a perspective view of the pressure relief plate of FIG. 6 with the pressure relief flaps partially opened in accordance with the present techniques.

FIGS. 6 and 7 are detailed views of the pressure relief plate 82 that is affixed to the top panel 14 of the enclosure 10. In particular, FIG. 6 depicts the pressure relief plate 82 in the closed position where the flaps 84 generally cover the openings 86 in the top panel 14. FIG. 7 depicts the pressure relief plate 82 in an open position where the flaps 84 have lifted to allow gases, such as those generated during an arc fault, to exit the enclosure 10 through the openings 86. The pressure relief plate 82 includes a perforated edge 138 that connects the flaps 84 to the pressure relief plate 82. According to certain embodiments, the perforated edge 138 may be located adjacent to the lifting angle 60. The lifting angle 60 may transversely divide the top panel 14 into a front portion 135 disposed proximate to the doors 24 and a rear portion 137 disposed proximate to the rear panel 17. In these embodiments, the pressure relief plate 82 may be located over the rear portion 137 of the top panel 14.

According to certain embodiments, the flaps 84 may be formed in the pressure relief plate 82 by stamping, punching, and/or laser cutting the pressure relief plate 82. The flaps 84 include outer edges 139 designed to abut the pressure relief plate 82 when the flaps are in the closed position. The other edges of the flaps 84 are not connected to the pressure relief plate 82. The flaps 84 are only connected to the pressure relief plate 82 by the perforated edge 138. Accordingly, the perforated edge 138 allows the flaps 84 to lift away from the pressure relief plate 82 to an open position while keeping the flaps 84 attached to the pressure relief plate 82. The flaps 84 also each include an interior edge 141 that is not connected to the pressure relief plate 82. The flaps 84 shown in FIG. 6 are designed so that the interior edges 141 abut the adjacent flap 84 when the flaps are in the closed position. However, in other embodiments, the flaps 84 may be spaced apart from one another so that the interior edges 141 abut the pressure relief plate 82, rather than the adjacent flap 84.

According to certain embodiments, the flaps 84 may be constructed of a lightweight material, such as aluminum, that allows the flaps 84 to open in response to pressure exerted on the flaps 84 by gases within the enclosure 10. When pressure is exerted on the flaps 84 by gases within the electrical enclosure 10, the flaps 84 may hinge open at the perforated edge 138 to allow the gases to exit the electrical enclosure 10. In summary, the flaps 84 allow gases to exit the enclosure 10 while the flaps 84 remain attached to the enclosure 10, which in certain embodiments, may facilitate compliance with arc resistant standards that specify that parts should not become detached and/or ejected from the enclosure 10 during an arc fault.

As shown in FIGS. 6 and 7, the top panel 14 includes two openings 86 that are separated by a strip section 140 of the top panel 14. The pressure relief plate 82 includes two flaps 84 that generally align with the openings 86. According to certain embodiments, the flaps 84 may be slightly larger than the openings 86. However, in other embodiments, the flaps 84 may be approximately the same size as the openings 86. Further, in other embodiments, the number of openings and flaps may vary. For example, in certain embodiments, the flaps and openings may be sized so that the flaps are lightweight enough to be opened by gases within the enclosure 10. Accordingly, the number of openings and flaps may depend on factors such as the type of material, the size of the enclosure, and the size of the top panel 14, among others. Further, in other embodiments, the shape of the flaps and openings may vary.

Figure 8:
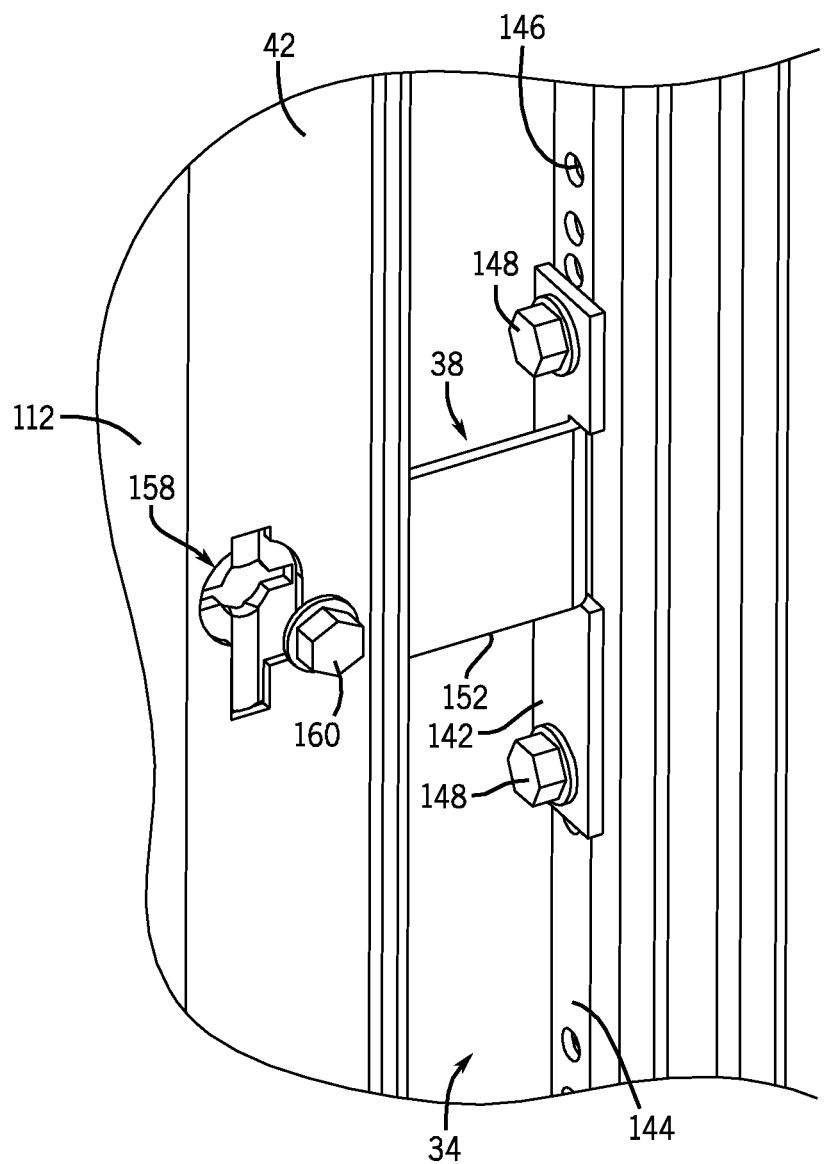
FIG. 8 is a perspective view of an embodiment of an arc latch bracket that may be employed in the electrical enclosure of FIG. 1 in accordance with the present techniques.
Figure 9:
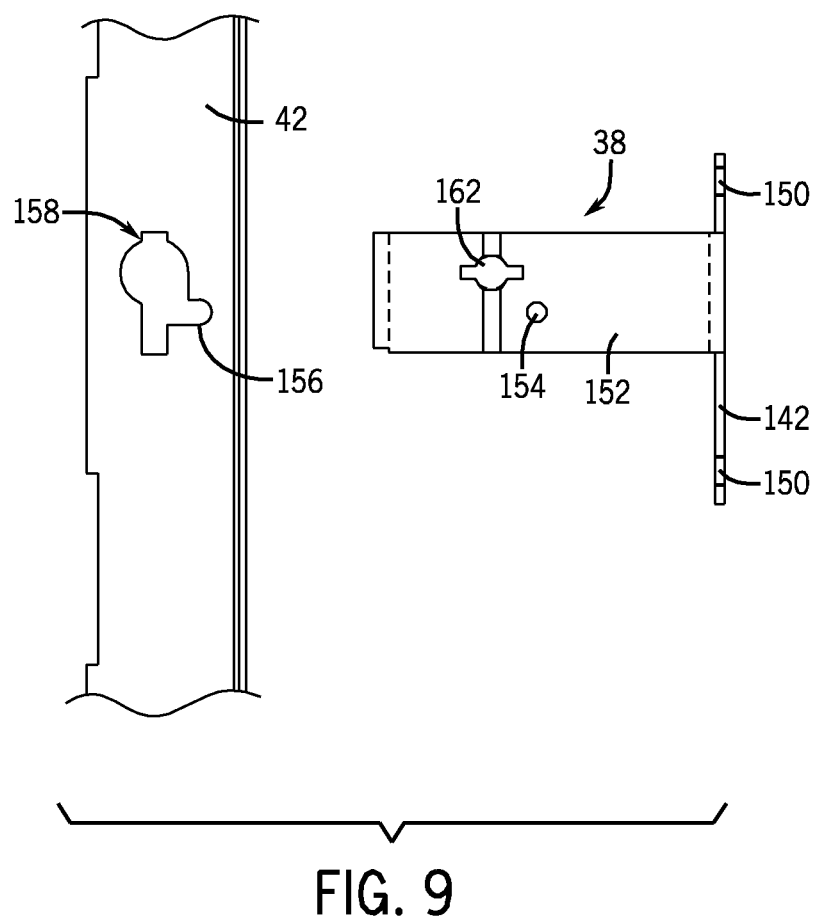
FIG. 9 is an exploded view of a portion of the arc latch bracket of FIG. 8 in accordance with the present techniques.

FIGS. 8 and 9 depict an embodiment of the latch bracket 38 that may be used to secure the wireway door 36 and the wireway baffle 42. In other embodiments, the latch bracket 38 can vary in size and/or shape depending on the door type and location of the latch bracket. The latch bracket 38 includes a base 142 that can be secured to a rail 144 of the side panel 15. The rail 144 may include a series of apertures 146 that can be employed to mount components to the side panel 15. For example, fasteners 148 may be inserted through corresponding apertures 150 in the base 142 to secure the latch bracket 38 to the side panel 15. The latch bracket 38 also includes a latch portion 152 that extends orthogonal to the base 142 and to the side panel 15. An aperture 154 in the latch portion 152 aligns with a portion 156 of an aperture 158 in the wireway baffle 42. A fastener 160 can be inserted through the apertures 154 and 158 to affix the wireway baffle 42 to the latch bracket 38. The latch portion 152 also includes a latch eye 162 that aligns with the aperture 158. A wireway door latch pin 40 (FIG. 1) can be inserted through the latch eye 162 and the aperture 158 and then rotated to secure the wireway door 36 (FIG. 1) in the closed position. As shown in FIG. 2, multiple latch brackets 38 may be employed to secure the wireway baffle 42 within the enclosure 10. The wireway baffle 42 may inhibit gases from within the enclosure 10 from escaping out of the enclosure 10 through the seam between the wireway door 36 and the side support 112, which may, in certain embodiments, facilitate compliance with arc resistant standards.

Figure 10:
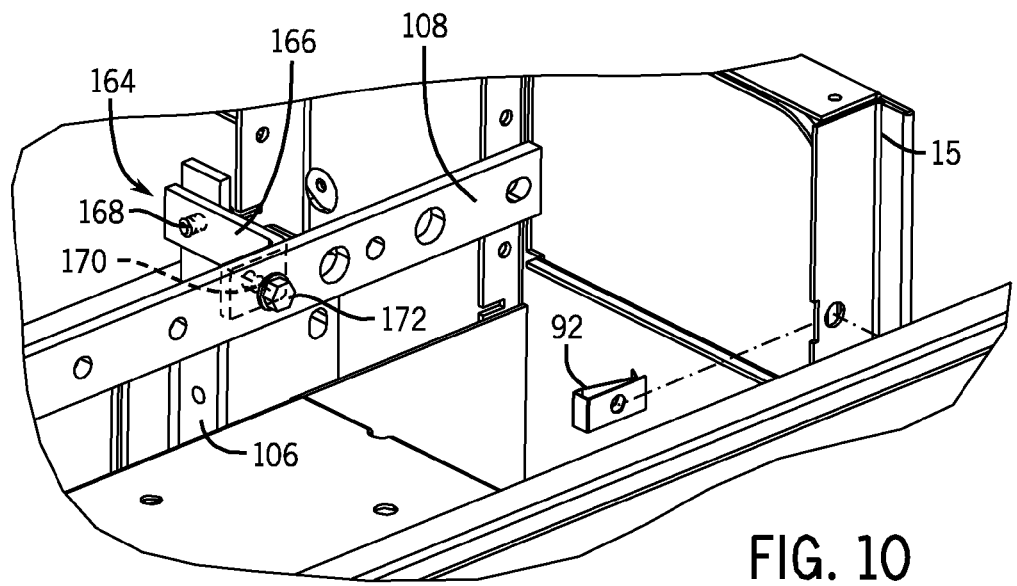
FIG. 10 is a perspective view of the horizontal ground bus of the electrical enclosure of FIG. 1 in accordance with the present techniques.
Figure 11:
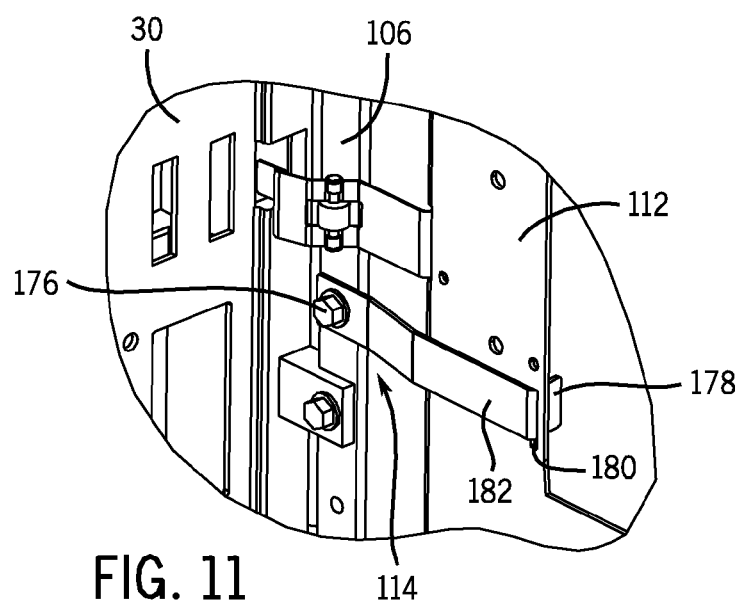
FIG. 11 is a perspective view of a portion of the vertical ground bus of the electrical enclosure of FIG. 1 in accordance with the present techniques.

FIGS. 10 and 11 depict attachment of the ground buses 106, 108, and 110 within the enclosure 10. The horizontal ground buses 108 and 110 may be located in the top and/or bottom of the enclosure 10, respectively. Further, the horizontal ground buses 108 and 110 may be coupled to the vertical ground bus 106, which in turn may be secured to the side support unit 112 to provide strength within the enclosure 10.

FIG. 10 shows attachment of the horizontal ground bus 108 to the vertical ground bus 106. Although not shown in FIG. 10, the other horizontal ground bus 110 may be attached in a similar manner. According to certain embodiments, an L-shaped bracket 164 is connected to the horizontal ground bus 108 and to the vertical ground bus 106. As shown in FIG. 10, the bracket 164 is a separate component that is affixed to the vertical ground bus 106. However, in other embodiments, the bracket 164 may be integrally formed with the vertical ground bus 106. The bracket 164 includes a first segment 166 that extends orthogonally from the horizontal ground bus 108 and abuts the vertical ground bus 106. A fastener 168 can be inserted through corresponding apertures in the vertical ground bus 106 and the segment 166 to affix the bracket 164 to the vertical ground bus 106. The bracket 164 includes another segment 170 that extends orthogonal to the first segment 166 and abuts the horizontal ground bus 108. A fastener 172 can be inserted through corresponding apertures in the horizontal ground bus 108 and the segment 170 to affix the bracket 164 to the horizontal ground bus 108. According to certain embodiments, the bracket 164 may be constructed of a metal, such as a copper, steel, or other suitable material. The other horizontal ground bus 110 may be attached to the vertical ground bus 106 in a similar manner. Accordingly, both horizontal ground buses 108 and 110 are coupled to the vertical ground bus 106 by brackets 164, which may provide strength within the enclosure 10.

FIG. 11 shows attachment of the vertical ground bus 106 to the side support 112. According to certain embodiments, a bracket 114 is connected to the vertical ground bus 106 and to the side support 112. The bracket may be constructed of steel, or other suitable material, to provide structural support within the enclosure 10. A fastener 176 may be inserted through corresponding openings in the bracket 114 and the vertical ground bus 106 to affix the bracket 114 to the vertical ground bus 106. The bracket 114 also includes a tab 178 that can be inserted through a corresponding slot 180 in the side support 112. The tab 178 extends through the slot 180 to couple the vertical ground bus 106 to the side support 112. According to certain embodiments, the tab 178 and slot 180 may be designed to inhibit motion of the vertical ground bus 106 within the enclosure 10. For example, the tab 178 and slot 180 may inhibit motion of the vertical ground bus 106 toward the top panel 14, the bottom panel 13, the doors 24, and the rear panel 17 in the even of an arc fault. The bracket 114 also includes a segment 182 that abuts the side support 112. According to certain embodiments, the segment 182 may abut against the side support 112 to inhibit motion of the vertical ground bus 106 toward the side panel 15 in the event of an arc fault.

Figure 12:
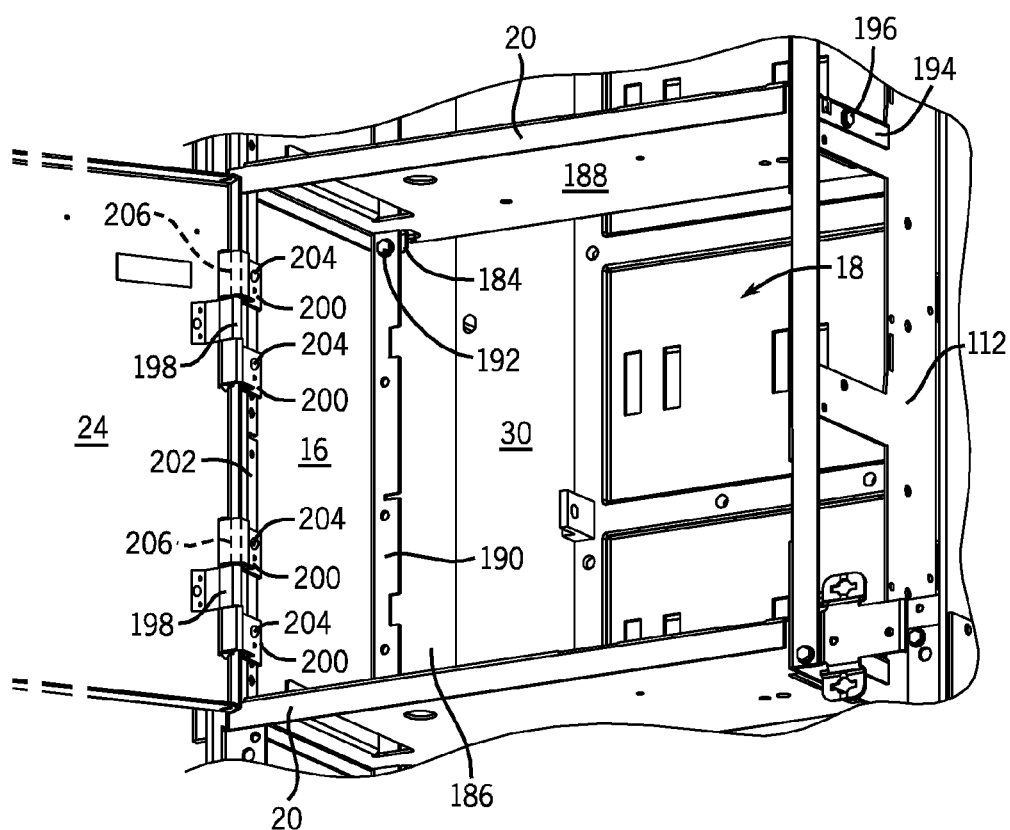
FIG. 12 is a perspective view of the interior of one of the compartments 18 of the electrical enclosure of FIG. 1 in accordance with the present techniques.

As shown in FIG. 12, the support pans 20 also may be attached to structural features of the enclosure 10 to provide structural support for the enclosure 10. For example, each support pan 20 may be attached to the side support 112 located adjacent to side panel 15 and to a side support 186 located adjacent to side panel 16. According to certain embodiments, the side support 186 may be a c-channel support that includes a rail section 190 that extends generally orthogonal to the side panel 16. Although not shown, the side support 186 may include another rail section that extends generally orthogonal to the side panel 16 on the opposite side of the bus cover 30 from the rail section 190.

The support pan 20 includes a tab 184 that extends orthogonally from the base 188 of the support pan 20. According to certain embodiments, the tab 184 may be located on a rear corner of the base 188 so that the tab 184 is located adjacent to the rail section 190. A fastener 192 may be inserted through corresponding apertures in the tab 184 and the rail section 190 to secure the support pan 20 to the side panel 186. According to certain embodiments, the fastener 192 may be a thread rolling fastener, such as a Taptite fastener. However, in other embodiments, the fastener may be a bolt or other suitable type fastener. Further, a nut or other suitable retaining mechanism may be affixed to the fastener 192.

The support pan 20 also may include a flange 194 that can be disposed over a portion of the side support 112. The flange 194 may extend orthogonally from the base 188 of the support pan 20. A fastener 196 can be inserted through corresponding apertures in the flange 194 and the side support 112 to secure the support pan 20 to the side support 112. According to certain embodiments, the fastener 196 may be a thread rolling fastener, such as a Taptite fastener. However, in other embodiments, the fastener may be a bolt or other suitable type fastener. Further, a nut or other suitable retaining mechanism may be affixed to the fastener. According to certain embodiments, the fastening of the support pans 20 to the side supports 112 and 186 may be designed to provide structural strength within the enclosure 10, and in certain embodiments, may inhibit twisting of the enclosure 10 during an arc fault.

FIG. 12 also depicts attachment of the doors 24 to the enclosure 10. The doors 24 may be securely attached to the enclosure 10 to provide structural support and to prevent separation of the doors from the enclosure 10 in the event of an arc fault. For example, the doors 24 may include hinge leafs 198 that are permanently affixed to the doors 24. According to certain embodiments, the hinge leafs 198 may be welded to the doors 24. However, in other embodiments, the hinge leafs 198 may be integrally formed as part of the doors 24. Each hinge leaf 198 may be surrounded by a pair of hinges 200 disposed on opposite sides of the hinge leaf 198 from one another. The hinges 200 may be affixed to a rail 202 of the side panel 16 to secure the doors 24 to the enclosure 10. According to certain embodiments, fasteners 204 may be inserted through corresponding apertures in the hinges 200 and the rail 202 to affix the hinges 200 to the rail 202. Hinge pins 206 may be inserted through the hinges 200 and the hinge leafs 198 to allow the door 24 to rotate with respect to the enclosure 10. According to certain embodiments, one or more of the pins 206 may interface with the hinge 204 disposed above the hinge leaf 198 so that the hinge 204 must be removed from the rail 202 in order to remove the hinge pin 206. Further, in other embodiments, the hinge and hinge leaf configuration may vary. For example, in certain embodiments, a relatively larger hinge can be secured to the rail 202 and can be surrounded on both sides by a hinge leaf secured to the door 24.

Figure 13:
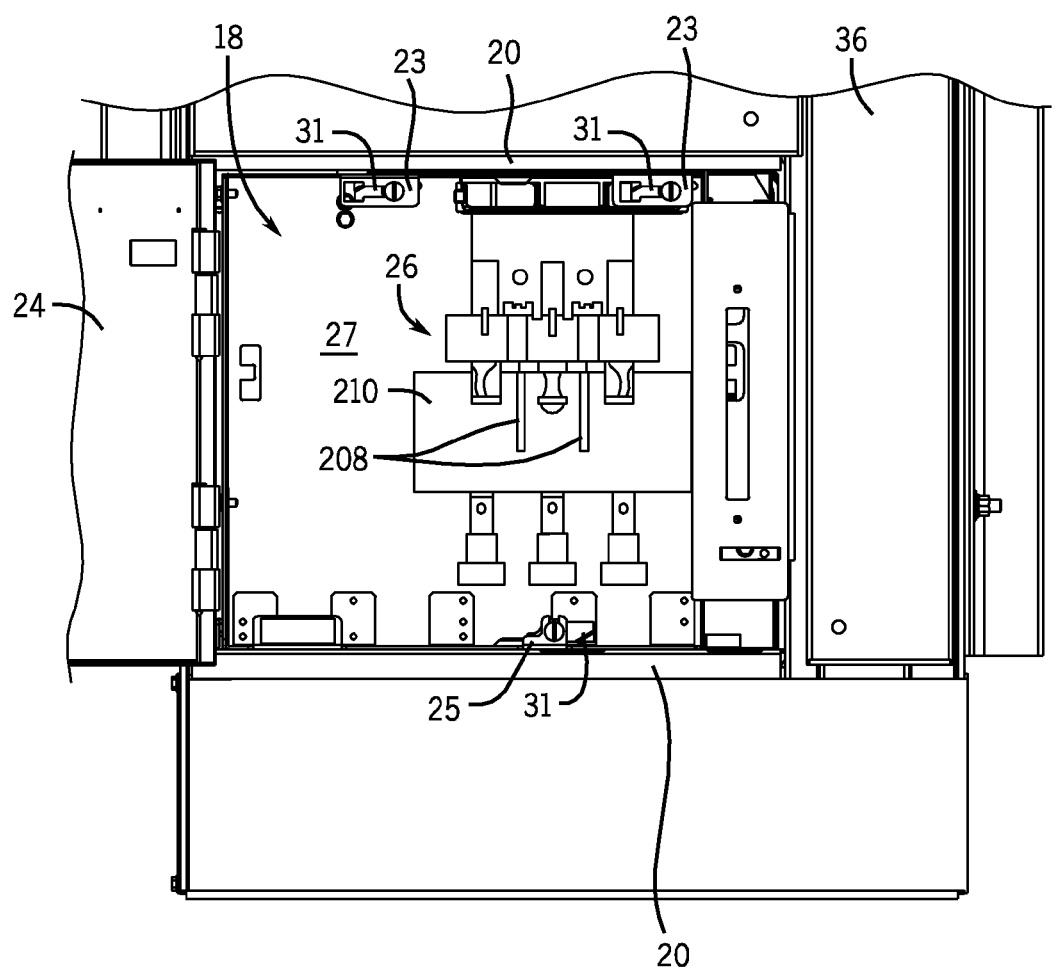
FIG. 13 is a perspective view of an embodiment of a component unit installed within a compartment of the electrical enclosure of FIG. 1 in accordance with the present techniques.

FIG. 13 depicts features of the component units 22 that can be employed to facilitate compliance with arc resistant standards. As discussed above with reference to FIG. 2, the component units 22 may be attached to the support pans 20 of the enclosure 10 using latches 23 and 25. The latches 23 and 25 may ensure that the component units 22 are retained within the compartments 18 in the event of an arc fault.

The component units 22 also may include features designed to inhibit arcing. For example, each component unit 22 may include a heavy duty ground stab (shown within stab housing 28 in FIG. 1). According to certain embodiments, the ground stabs may be located behind the components 26. The components 26 that serve as protective devices, such as circuit breakers and fusible disconnects, among others, may include interphase barriers 208 that are disposed on the line side of the components 26. According to certain embodiments, the interphase barriers 208 may be polycarbonate barriers, or other insulating barriers, that are disposed between phases. The component units 22 also may have insulation 210 disposed on the line side of the components 26 between component conductors and the ground. For example, in certain embodiments, the insulation 210 may be disposed between a component 26 and the portion of the housing 27 that connects to the stab housing 28. According to certain embodiments, the insulation 210 may be polypropylene insulation, such as Formex insulation, which is commercially available from ITW Formex of Addison, Ill. As shown in FIG. 13, the component 26 generally represents a circuit breaker. However, as may be appreciated, the component unit features described herein may be applied to any suitable type of component unit including various types of components, such as disconnects, fuses, circuit breakers, switches, drives, and starter units, among others.

FIG. 14 depicts another embodiment of an arc resistant enclosure 212. Rather than including a single shell 12, the enclosure 212 includes three shells 214, 216, and 218 connected together to form a single enclosure lineup. Each shell 214, 216, and 218 may include features described above with respect to FIGS. 1 to 13. For example, each shell 214, 216, and 218 may include a pressure relief plate 82, as well as other features described above. Further, certain features may be included only at ends 220 and 222 of the enclosure lineup. For example, shells 218 and 214 may each include an external angle 48 disposed on their outer side panel, while shell 216 may not include an external angle. In another example, the rear corners of shells 218 and 214 may include corner baffles 104, which may not be included in shell 216. Moreover, in other embodiments, shells 12 may be disposed in a back-to-back configuration where the shells 12 can be connected at the rear panels 17. When the shells 12 are joined in a back-to-back configuration, the rear panels 17 may or may not be present.

Figure 15:
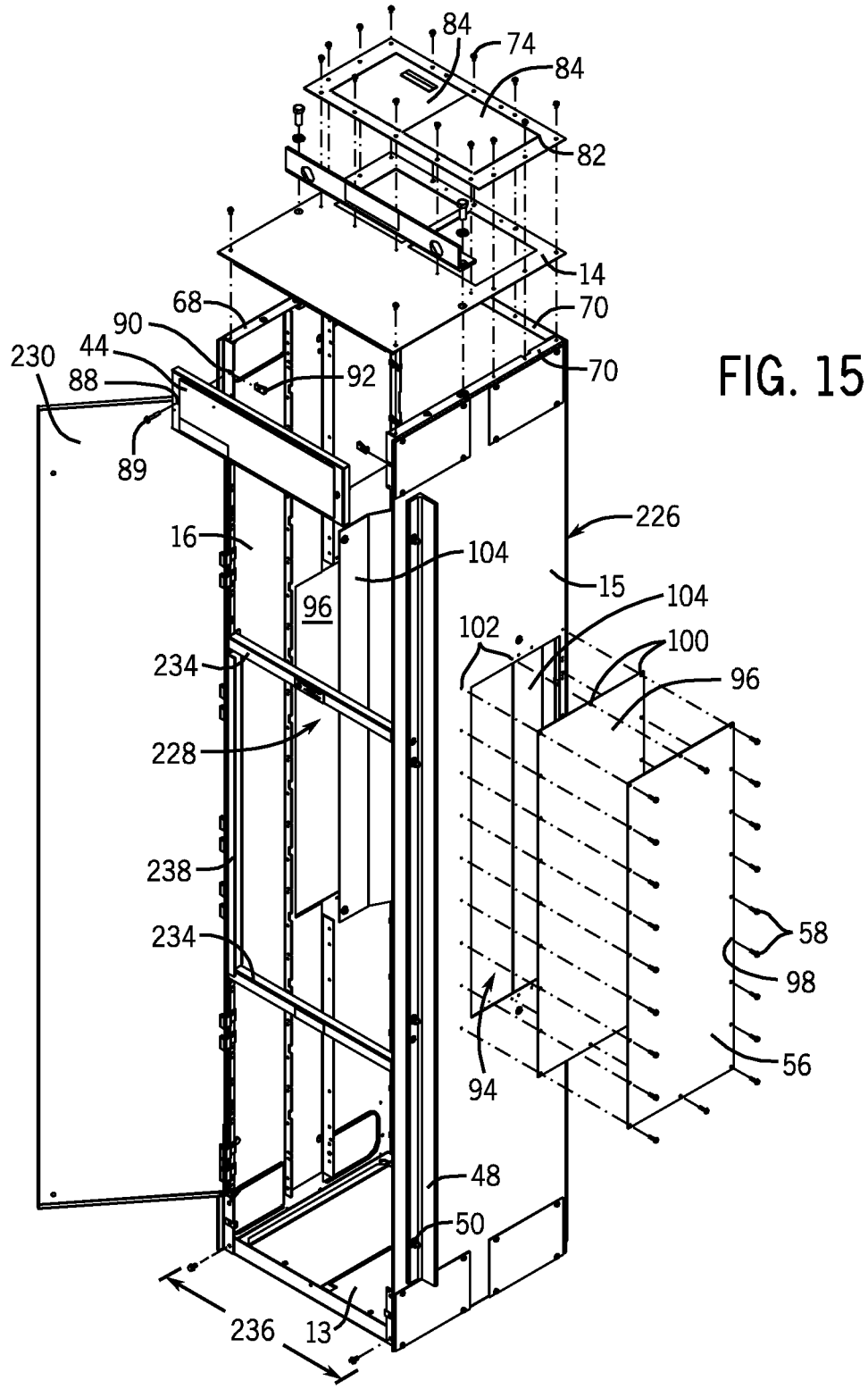
FIG. 15 is an exploded view of another embodiment of an electrical enclosure in accordance with the present techniques.

FIG. 15 depicts another embodiment of an arc resistant enclosure 224. Rather than including several compartments 18 (FIG. 2), the enclosure 224 includes a shell 226 that encloses a large unit area 228 that can hold one or more components 26. The unit area 228 may be enclosed by a door 230 that can be latched to the shell 226 to secure the door 230 in the closed position. The door may be connected to the enclosure 224 using hinges 200 and hinge leafs 198, as described above with respect to FIG. 12. The enclosure 224 also may include external angles 48, a pressure relief plate 82, a horizontal wireway cover 44, insulated plates 96, side closing plates 56, and corner baffles 104, as well as other arc resistant features described above with respect to FIGS. 1 to 13. The enclosure 224 also includes stiffener brackets 234 that extend along a full width 236 of the enclosure 224 between the side panels 15 and 16. A front baffle 238 may be connected to the side panel 16 near the door hinges to inhibit the flow of gases through the seam between the door 230 and the side panel 16. Further, although not shown, a full mounting plate with metal, plastic, or polycarbonate splice covers may be inserted into the enclosure 224 to separate the unit area 228 from a rear bus compartment.

The foregoing features may be designed to add structural strength for arc containment, to inhibit arc propagation, and/or to direct the release of pressure within and/or from the enclosure 10 in order to provide arc resistant electrical enclosures 10. Several of the foregoing features may direct the release of pressure and gases within the enclosures 10. For example, the inclusion of a corner baffle 104 (FIG. 2) may inhibit the flow of gases out of the ends of an enclosure lineup and may direct the gases towards the pressure relief plate 82. In another example, in frame mount enclosures, the front baffle 238 (FIG. 15) may inhibit the flow of gases out of the front of the enclosure and may direct the gases toward the pressure relief plate 82. Further, the inclusion of a pressure relief plate 82 (FIGS. 6 and 7) may direct the gases out of the top panel 14 of the enclosure 10 to relieve pressure within the enclosure 10. Moreover, the pressure relief plate 82 may be located on a rear portion 137 (FIG. 7) of the top panel 14 to direct the gases toward the rear of the enclosure 10 and away from the front of the enclosure, which includes the doors 24 and 36.

Several of the foregoing features also may inhibit arc propagation in the event of an arc fault. For example, the insulated side closing plate 96 (FIG. 2) may reduce arcing at the end of the enclosure lineup. In another example, the use of heavy duty ground stabs (within housing 28, shown in FIG. 1) in each component unit 22 may inhibit the formation and/or propagation of arcs. Moreover, the use of interphase barriers 208 and insulation 210, as shown in FIG. 13, also may inhibit the formation and/or propagation of arcs. In yet another example, the use of a full mounting plate within a frame mount unit as shown in FIG. 15 may create separation between the component unit area and the rear bus compartment to inhibit arc propagation.

Several of the foregoing features further may provide structural strength to the enclosures 10. For example, as described above with respect to FIG. 2, the external angles 48 may inhibit bowing of the enclosure 10. Further, for frame mount enclosures, the use of stiffener brackets 234 (FIG. 15) that extend across the full width of the enclosure may provide internal support and structure for the enclosure. In another example, the use of u-nuts 92 (FIG. 4) to secure the horizontal wireway covers 44 and 46 may ensure that the covers remain attached in the event of an arc fault, which in turn may provide structural support for the enclosure 10. In another example, the wireway arc latches 38 (FIG. 8) may ensure that the wireway door 36 remains closed. Further, as shown in FIGS. 2 and 10, the connection of the horizontal ground buses 108 and 110 to the vertical ground bus 106 may provide internal support for the enclosure 10. Moreover, as shown in FIG. 12, the attachment of the vertical ground bus 106 to the side support 112 and the attachment of the support pans 20 to the side supports 112 and 186 also may provide internal support for the enclosure 10. Additionally, the use of component unit latches 23 (FIG. 2) may ensure that the component units 22 remain in the compartments 18 in the event of an arc fault. In a further example, the inclusion of dual hinges 200 and welded hinge leafs 198, and/or the inclusion of a relatively larger hinge surrounded on both sides by a hinge leaf, may ensure that the doors 24 remain attached to the enclosure in the event of an arc fault.

In general, the foregoing features may be designed to provide enclosures that meet arc resistant standards, guides, and/or criteria. For example, the features may be designed so that, in the event of an arc fault, the doors and covers remain closed, parts are not ejected from the enclosure, holes are not produced in the enclosure, indicators located in close proximity to the enclosure do not ignite, and/or grounding connections remain effective. Further, the foregoing features may be designed to provide electrical enclosures that comply with industry guides, criteria, and/or standards for arc resistant ratings. For example, certain embodiments of electrical enclosures having the features described above were tested and found to satisfy the criteria established in IEEE C37.20.7 (2007). In another example, certain embodiments of electrical enclosures having the features described above were tested and found to comply with IEC TR 61641 (2008). Although the preceding internal arc fault testing guides are generally applicable to low-voltage switchgear, the preceding guides may be used to develop similar standards, guides, and/or criteria that are applicable to other types of low-voltage equipment, such as motor control components and protection devices.

While only certain features of the invention have been illustrated and described herein, many modifications and changes will occur to those skilled in the art. It is, therefore, to be understood that the appended claims are intended to cover all such modifications and changes as fall within the true spirit of the invention. Further, although individual embodiments are discussed herein, the disclosure is intended to cover all combinations of these embodiments.

The invention claimed is:

1. An electrical enclosure, comprising:
   a shell configured to house electrical components within one or more interior compartments of the shell, the shell comprising opposing side panels, a rear panel coupled to the opposing side panels, and a top panel coupled to and disposed orthogonal to the opposing side panels and the rear panel, wherein the top panel comprises one or more apertures;
   at least one door for accessing the interior compartments;
   a pressure relief plate coupled to the top panel or integral with the top panel and comprising one or more flaps disposed over the one or more apertures and connected to the pressure relief plate by a perforated edge that enables the flaps to open to allow gases to escape from the shell; and
   a corner baffle disposed inside the shell and coupled to one of the opposing side panels, wherein the corner baffle comprises a first section that extends along and is coupled to the one of the opposing side panels, a second section that extends along and is coupled to the rear panel, and a third section coupled between the first and second sections, wherein the corner baffle extends axially along a corner formed where the one of the opposing side panels is coupled to the rear panel such that the third section forms a barrier opposite an angle formed by the corner.

2. The electrical enclosure of claim 1, wherein the shell comprises a single interior compartment to house electrical components, the electrical enclosure comprises a single door for accessing the single interior compartment, and the electrical enclosure comprises at least one stiffener bracket extending between the opposing side panels and disposed adjacent to the single door such that the stiffener bracket extends across an opening of the shell that defines the single interior compartment.

3. The electrical enclosure of claim 1, comprising an external angle oriented along a length of and extending outward from one of the opposing side panels in a direction away from the one or more interior compartments of the shell, wherein the direction is substantially perpendicular to a plane of the one of the opposing side panels.

4. The electrical enclosure of claim 3, comprising a plurality of shells joined together and configured to house electrical components within interior compartments of each of the shells, wherein a first shell disposed at a first end of the plurality of shells comprises a first external angle oriented along a length of and extending outward from a first side panel at the first end of the plurality of shells, the first external angle extending in a direction away from the one or more interior compartments of the first shell, wherein the direction is substantially perpendicular to a plane of the first side panel, and wherein a second shell disposed at a second end of the plurality of shells opposite the first end comprises a second external angle oriented along a length of and extending outward from a second side panel at the second end of the plurality of shells, the second external angle extending in a direction away from the one or more interior compartments of the second shell, wherein the direction is substantially perpendicular to a plane of the second side panel.

5. The electrical enclosure of claim 3, wherein the external angle is oriented along the length of the side panel from the top panel to a bottom panel of the shell, and wherein the external angle comprises a length of approximately 80 to 95 percent of a total length of the side panel.

6. The electrical enclosure of claim 1, comprising a plurality of shells joined together and configured to house electrical components within interior compartments of each of the shells, wherein a first shell disposed at a first end of the plurality of shells comprises a first opening for accessing the interior compartments through a first side panel at the first end of the plurality of shells, and comprising a first side closing plate and a first insulated plate coupled to the first side panel to cover the first opening, wherein the first insulated plate is disposed between the first side closing plate and the first opening, and wherein a second shell disposed at a second end of the plurality of shells opposite the first end comprises a second opening for accessing the interior compartments through a second side panel at the second end of the plurality of shells, and comprising a second side closing plate and a second insulated plate coupled to the second side panel to cover the second opening, wherein the second insulated plate is disposed between the second side closing plate and the second opening.

7. An electrical enclosure, comprising:
   a first shell configured to house electrical components within interior compartments of the first shell, the first shell comprising a first side panel, a second side panel disposed opposite of the first side panel, a rear panel coupled to the first and second side panels, and a top panel coupled to and disposed orthogonal to the first and second side panels and the rear panel, wherein the top panel comprises one or more apertures;
   a corner baffle disposed inside the first shell and coupled to one of the first or second side panels, wherein the corner baffle comprises a first section that extends along and is coupled to the one of the first or second side panels, a second section that extends along and is coupled to the rear panel, and a third section coupled between the first and second sections, wherein the corner baffle extends axially along a corner formed where the one of the first or second side panels is coupled to the rear panel such that the third section forms a barrier opposite an angle formed by the corner;
   a pressure relief plate coupled to the top panel and comprising one or more flaps disposed over the one or more apertures and connected to the pressure relief plate by a perforated edge that enables the flaps to open to allow gases to escape from the first shell;
   a plurality of unit support pans extending orthogonal to the first and second side panels to divide the first shell into the interior compartments;
   a plurality of compartment doors coupled to the first side panel, wherein each door is configured to enclose one of the interior compartments; and
   a wireway door coupled to the second side panel to enclose a vertical wireway extending along a length of the electrical enclosure;
   wherein each of the plurality of compartment doors comprises a hinge leaf permanently affixed to the compartment door and comprises a pair of hinges coupled to the first side panel and disposed on opposite sides of the hinge leaf to interface with the hinge leaf.

8. The electrical enclosure of claim 7, wherein each of the plurality of unit support pans is secured to a first side support extending parallel to the first side panel via a tab extending orthogonally from a base section of the support pan such that the tab is disposed adjacent the first side support, and is secured to a second side support extending parallel to the second side panel via a flange extending orthogonally from the base section and oriented substantially perpendicular to the tab such that the flange is disposed over a portion of the second side support.

9. The electrical enclosure of claim 7, wherein the each of the plurality of compartment doors comprises a hinge leaf coupled to the compartment door via a weld.

10. The electrical enclosure of claim 7, wherein the each of the plurality of compartment doors comprises a hinge leaf that is integral with the compartment door.

11. The electrical enclosure of claim 7, comprising a hinge pin configured to be inserted through the pair of hinges and the hinge leaf to allow the compartment door to rotate with respect to the first shell, wherein the hinge pin is configured to interface with the hinge disposed above the hinge leaf such that the hinge pin cannot be removed unless the hinges are first removed from the first shell.

12. An electrical enclosure, comprising:
a first shell configured to house electrical components within interior compartments of the first shell, the first shell comprising a first side panel, a second side panel disposed opposite of the first side panel, a rear panel coupled to the first and second side panels, and a top panel coupled to and disposed orthogonal to the first and second side panels and the rear panel, wherein the top panel comprises one or more apertures;
a pressure relief plate coupled to the top panel and comprising one or more flaps disposed over the one or more apertures and connected to the pressure relief plate by a perforated edge that enables the flaps to open to allow gases to escape from the first shell;
a plurality of unit support pans extending orthogonal to the first and second side panels to divide the first shell into the interior compartments;
a plurality of compartment doors coupled to the first side panel, wherein each door is configured to enclose one of the interior compartments;
a wireway door coupled to the second side panel to enclose a vertical wireway extending along a length of the electrical enclosure;
wherein each of the plurality of compartment doors comprises a hinge leaf permanently affixed to the compartment door and comprises a pair of hinges coupled to the first side panel and disposed on opposite sides of the hinge leaf to interface with the hinge leaf; and
a plurality of brackets coupled to and extending orthogonal to the second side panel, wherein each of the plurality of brackets comprise a latch eye configured to receive a pin of the wireway door to secure the wireway door in a closed position, and comprising a wireway baffle configured to inhibit the gases from flowing through a seam where the wireway door seals against the first shell, wherein the wireway baffle is secured within the electrical enclosure via the plurality of brackets.

13. The electrical enclosure of claim 12, wherein each of the plurality of brackets comprises an aperture separate from the latch eye, and wherein the wireway baffle comprises a single aperture configured to be disposed over the latch eye and the aperture of the bracket such that the wireway baffle is coupled to the bracket via a fastener disposed through the single aperture of the wireway baffle and the aperture of the bracket, and wherein the single aperture of the wireway baffle is configured to receive the pin disposed through the latch eye of the bracket.

14. An electrical enclosure, comprising:
a shell configured to house electrical components within one or more interior compartments of the shell, the shell comprising a first side panel, a second side panel disposed opposite of the first side panel, a rear panel coupled to the first and second side panels, a bottom panel coupled to and disposed orthogonal to the first and second side panels and the rear panel, and a top panel coupled to and disposed orthogonal to the first and second side panels and the rear panel, wherein the top panel comprises one or more apertures;
a pressure relief plate coupled to the top panel and comprising one or more flaps disposed over the one or more apertures and connected to the pressure relief panel by a perforated edge that enables the flaps to open to allow gases to escape from the shell;
at least one compartment door coupled to the first side panel to enclose the one or more interior compartments;
a side support extending generally parallel to the second side panel to separate a vertical wireway from the one or more interior compartments;
a wireway door coupled to the second side panel to enclose the vertical wireway; and
an external angle oriented along a length of and extending outward from an external surface of one of the first and second side panels in a direction away from the one or more interior compartments of the shell, wherein the direction is substantially perpendicular to a plane of the side panel;
a vertical ground bus disposed in the vertical wireway and coupled to the side support and to the first horizontal ground bus and the second horizontal ground bus; and
a plurality of brackets fastened to the vertical ground bus, wherein the side support comprises a plurality of slots and wherein each of the plurality of brackets comprises a tab configured to be inserted through a corresponding slot of the plurality of slots and a segment of the bracket configured to abut the side support when the tab is extended within the corresponding slot.

15. The electrical enclosure of claim 14, comprising a first horizontal wireway cover coupled to the first and second side panels by u-nuts to enclose the first horizontal wireway and comprising a second horizontal wireway cover coupled to the first and second side panels by additional u-nuts to enclose the second horizontal wireway, wherein each of the first and second side panels comprise a flange configured to receive the u-nuts such that opposing surfaces of each u-nut are disposed on opposite sides of the flange and a threaded portion of the u-nut is aligned with an aperture through the flange.

16. The electrical enclosure of claim 14, comprising a first L-shaped bracket connected to the first horizontal ground bus and the vertical ground bus, wherein the first L-shaped bracket comprises a first segment that extends orthogonally from the first horizontal ground bus and abuts the vertical ground bus and a second segment that extends orthogonal to the first segment and abuts the first horizontal ground bus, and a second L-shaped bracket connected to the second horizontal ground bus and the vertical ground bus, wherein the second L-shaped bracket comprises a first segment that extends orthogonally from the second horizontal ground bus and abuts the vertical ground bus and a second segment that extends orthogonal to the first segment and abuts the second horizontal ground bus.

17. The electrical enclosure of claim 14, comprising a plurality of shells joined together and configured to house electrical components within interior compartments of each of the shells, wherein a first shell disposed at a first end of the plurality of shells comprises a first external angle oriented along a length of and extending outward from a first side panel at the first end of the plurality of shells, the first external angle extending in a direction away from the one or more interior compartments of the first shell, wherein the direction is substantially perpendicular to a plane of the first side panel, and wherein a second shell disposed at a second end of the plurality of shells opposite the first end comprises a second external angle oriented along a length of and extending outward from a second side panel at the second end of the plurality of shells, the second external angle extending in a direction away from the one or more interior compartments of the second shell, wherein the direction is substantially perpendicular to a plane of the second side panel.

* * * * *